US010148817B2

United States Patent
Liebisch et al.

(10) Patent No.: US 10,148,817 B2
(45) Date of Patent: Dec. 4, 2018

(54) VIRTUAL QUEUING SYSTEM

(71) Applicant: VIRTUALQ GMBH, Stuttgart (DE)

(72) Inventors: Niels Arndt Liebisch, Lehrte (DE); Ulf-Karl-Hugo Kuehnapfel, Stuttgart (DE); Jens Martin Kuehnapfel, Stuttgart (DE)

(73) Assignee: VIRTUALQ GMBH, Stuttgart (DE)

( * ) Notice: Subject to any disclaimer, the term of this patent is extended or adjusted under 35 U.S.C. 154(b) by 0 days.

(21) Appl. No.: 15/736,302

(22) PCT Filed: May 13, 2016

(86) PCT No.: PCT/EP2016/060820
§ 371 (c)(1),
(2) Date: Dec. 14, 2017

(87) PCT Pub. No.: WO2016/202507
PCT Pub. Date: Dec. 22, 2016

(65) Prior Publication Data
US 2018/0176377 A1    Jun. 21, 2018

(30) Foreign Application Priority Data
Jun. 15, 2015 (EP) .................................. 15172170

(51) Int. Cl.
*H04M 3/00* (2006.01)
*H04M 3/51* (2006.01)
(Continued)

(52) U.S. Cl.
CPC ....... *H04M 3/5175* (2013.01); *H04M 3/5166* (2013.01); *H04M 3/5191* (2013.01);
(Continued)

(58) Field of Classification Search
CPC .. H04M 3/5175; H04M 3/523; H04M 3/5191; H04M 3/5183; H04M 3/51;
(Continued)

(56) References Cited

U.S. PATENT DOCUMENTS 5,627,884 A    5/1997   Williams et al.
6,975,720 B1   12/2005  Crook
(Continued)

FOREIGN PATENT DOCUMENTS

GB    2 477 558 A    8/2011

OTHER PUBLICATIONS

M. A. Feinberg: "Performance characteristics of automated call distribution systems", Global Telecommunications Conference and Exhibition. Communications: Connecting the Future, GLOBECOM '90. vol. 1, pp. 415-419 (1990).

*Primary Examiner* — Rasha Al Aubaidi
(74) *Attorney, Agent, or Firm* — Norman B. Thot

(57) ABSTRACT

A virtual queuing system includes a server connected to a call center. The call center includes an automatic call distributor and a firewall. The server maintains virtual queues. User interfaces enqueu a call by a user of the call center to the virtual queues via the server. An application programming interface interfaces the user interfaces to the server. A virtual queuing connector module connects the automatic call distributor of the call center to the application programming interface across the firewall of the call center via requests or pulls initiated by the virtual queuing connector module. The virtual queuing connector module and the automatic call distributor are operated inside the firewall. The server, the application programming interface, and the user interfaces are operated outside the firewall. When a call is up, the call is connected as a prioritized call, assigned to a reserved IVR channel, and put through first.

14 Claims, 5 Drawing Sheets

(51) Int. Cl.
*H04M 3/523* (2006.01)
*H04M 3/428* (2006.01)
*H04M 3/48* (2006.01)

(52) U.S. Cl.
CPC ........ *H04M 3/5231* (2013.01); *H04M 3/4286* (2013.01); *H04M 3/48* (2013.01); *H04M 2203/252* (2013.01); *H04M 2203/253* (2013.01); *H04M 2203/256* (2013.01); *H04M 2203/407* (2013.01)

(58) Field of Classification Search
CPC ............. H04M 3/5166; H04M 3/5233; H04M 3/5232; H04M 3/5158; H04M 3/5235; H04M 3/5238
USPC ............. 379/265.01–265.02, 265.09, 265.11, 379/266.01, 266.07
See application file for complete search history.

(56) References Cited

U.S. PATENT DOCUMENTS

| | | | |
|---|---|---|---|
| 2006/0146987 A1* | 7/2006 | Haukilahti | H04M 3/5232 379/67.1 |
| 2007/0286220 A1* | 12/2007 | Stenning | G07C 11/00 370/412 |
| 2011/0185293 A1 | 7/2011 | Barnett et al. | |
| 2013/0322615 A1* | 12/2013 | Oristian | H04M 3/5232 379/266.06 |
| 2014/0226809 A1 | 8/2014 | King | |
| 2017/0011311 A1* | 1/2017 | Backer | G06Q 10/02 |

\* cited by examiner

VIRTUAL QUEUING SYSTEM

CROSS REFERENCE TO PRIOR APPLICATIONS

This application is a U.S. National Phase application under 35 U.S.C. § 371 of International Application No. PCT/EP2016/060820, filed on May 13, 2016 and which claims benefit to European Patent Application No. 15172170.1, filed on Jun. 15, 2015. The International Application was published in English on Dec. 22, 2016 as WO 2016/202507 A1 under PCT Article 21(2).

FIELD

The present invention relates to a virtual queuing system and to a method of operating the system. The present invention further relates to a corresponding computer program and to a computer-readable storage medium comprising the program.

BACKGROUND

State-of-the-art call centers use an automatic call distributor (ACD) to distribute incoming calls to specific agents or other resources throughout the center. Traditional automatic call distributors hold queued calls according to a first-come, first-served policy until agents become available. From the call center's perspective, a long queue results in abandoned calls, repeat call attempts, and ensuing customer dissatisfaction. These and other performance characteristics have been widely researched and investigated, for example, by Michael A. Feinberg, Performance characteristics of automated call distribution systems, Global Telecommunications Conference, 1990, and Exhibition, "Communications: Connecting the Future", GLOBECOM '90, IEEE. 1990, Vol. 1, pp. 415-419.

An improved concept is known in the art as virtual queuing. Known virtual queuing systems allow customers to be called back by the call center instead of waiting in an automatic call distribution queue. As an example, U.S. Pat. No. 5,627,884 describes a method wherein caller information is automatically taken from a caller on hold, the call disconnected, and finally returned at the time when the caller would have been serviced had the caller stayed on hold. The caller's number is verified and either DTMF or verbal extension information is used to reconnect the call.

US 2014/226809 describes a virtual queuing server connected to a call center and maintaining virtual queues and a telephone for enqueuing a user of the call center to the virtual queues via the virtual queuing server. Virtual queuing is described using both a smartphone app (one user interface) and using a telephone (second user interface).

Known methods provides users with little or no indication of the expected time the caller will spend on virtual hold. The user is unable to predict when to expect the envisaged call-back, in particular when disconnected from the call center.

SUMMARY

An aspect of the present invention is to improve upon the prior art.

In an embodiment, the present invention provides a virtual queuing system which includes a virtual queuing server connected to a call center. The call center comprises an automatic call distributor and a firewall. The virtual queuing server is configured to maintain virtual queues. A plurality of user interfaces is configured to enqueu a call by a user of the call center to the virtual queues via the virtual queuing server. A RESTful application programming interface is configured to interface the plurality of user interfaces to the virtual queuing server. A virtual queuing connector module is configured to connect the automatic call distributor of the call center to the RESTful application programming interface across the firewall of the call center via requests or pulls initiated by the virtual queuing connector module. The virtual queuing connector module and the automatic call distributor are operated inside the firewall. The virtual queuing server, the RESTful application programming interface, and the plurality of user interfaces are operated outside the firewall. When a call is up, the call is connected as a prioritized call, assigned to a reserved IVR channel, and put through first.

BRIEF DESCRIPTION OF THE DRAWINGS

The present invention is described in greater detail below on the basis of embodiments and of the drawings in which.

DETAILED DESCRIPTION

The present invention has the major advantage of providing a variety of user interfaces, thereby lifting the inherent restrictions of the conventional call-back approach. An embodiment of the present invention makes use of a connector module designed as an add-on to routing software by various providers, thereby eliminating the need for an equivalent stand-alone solution or extensive re-training of call center staff.

Prior to being served by a call center agent, a user of the proposed system is assigned a next-in-line position among the parking positions of a so-called side queue and prompted through the user interface to call the call center on an individually assigned number to advance to the active position, causing the call to be placed in a prioritized position. This inventive approach not only relieves the user from entering, for example, an access code or PIN to connect to the user's agent, but also avoids any slack period on the side of the agent, the latter thus being available to serve other customers until the user actually calls back.

Figure 1:
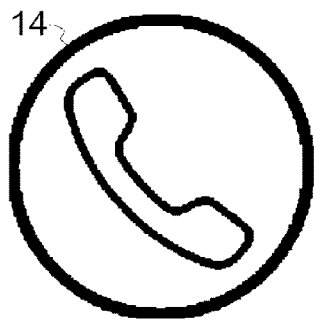
FIG. 1 shows an overview of the virtual queuing system's main user interfaces.
Figure 1:
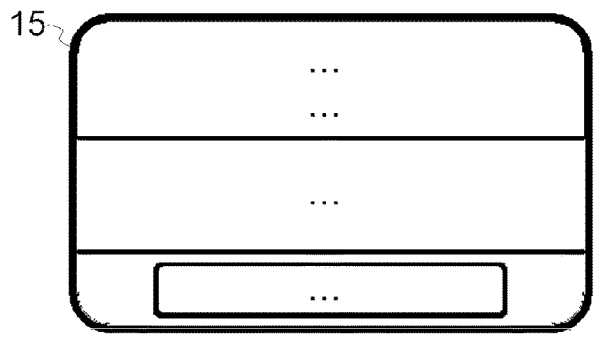
Figure 1:
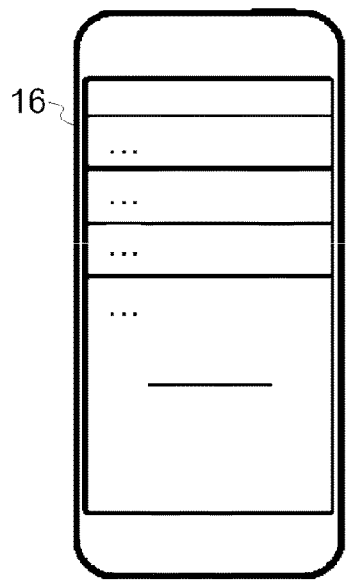
Figure 1:
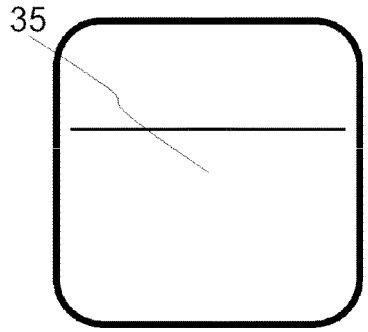

FIG. 1 shows the plurality of user interfaces (14, 15, 16, 35) of a virtual queuing system (10) according to an embodiment of the present invention. FIG. 1 shows that the user interfaces (14, 15, 16, 35) firstly comprise a conventional waiting call (14) based on voice announcements and text messaging. Secondly, a widget (15) for webpages (providing visual feedback as well as a waiting link) informs the user of his/her contact number and of the approximate waiting time for a given queue in minutes, for example, summarizing the sequence of events while waiting before a call is started. By pressing a pushbutton near the bottom of the widget (15), the user may choose to join the queue. The virtual queuing system (10) will in this case hold the user's waiting position, connecting the user to the next available agent (31) when the user is up. Thirdly, a native customer app (16), optionally branded according to a corporate design, may present a selection of available queues, indicate the number of customers on hold in each queue, and allow the user to join a queue of his/her choice. Fourthly and lastly, a smart watch (35) may serve as an alternative medium.

Figure 2:
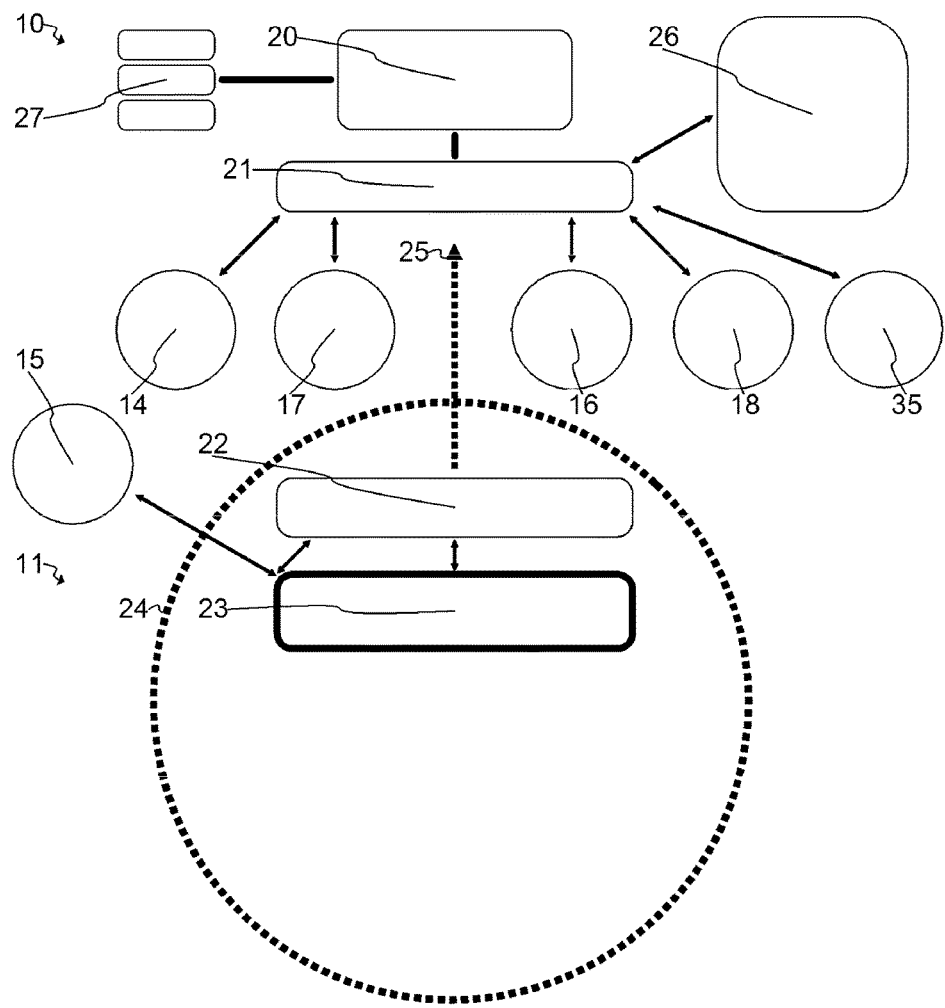
FIG. 2 shows an embodiment of software architecture of the virtual queuing system.

As shown in FIG. 2, the virtual queuing system (10) is based on a virtual queuing server (20) connected to the call center (11). The virtual queuing server (20) maintains virtual queues managed by a database (27) attached to the virtual queuing server (20). A RESTful application programming interface (21) interfaces the web widget (15), web interface (17), native customer apps (16), additional generic apps (18), smartwatch (35), and a customer dashboard (26) to the virtual queuing server (20). The customer dashboard (26) provides various self-service, data and statistics, billing, setup, and benchmarking functionality.

Since the automatic call distributor (23) of the call center (11) is operated inside a firewall (24), while the virtual queuing server (20), the application programming interface (21), and the user interfaces (14, 15, 16, 17, 18, 35) are operated outside of the firewall (24), a virtual queuing connector module (22) of the virtual queuing system (10) is further operated inside the firewall (24) to connect the automatic call distributor (23) to the application programming interface (21) across the firewall (24) via requests or pulls (25) initiated by the virtual queuing connector module (22). The virtual queuing connector module (22) is also configured to monitor the waiting call (14) via the automatic call distributor (23).

Figure 3:
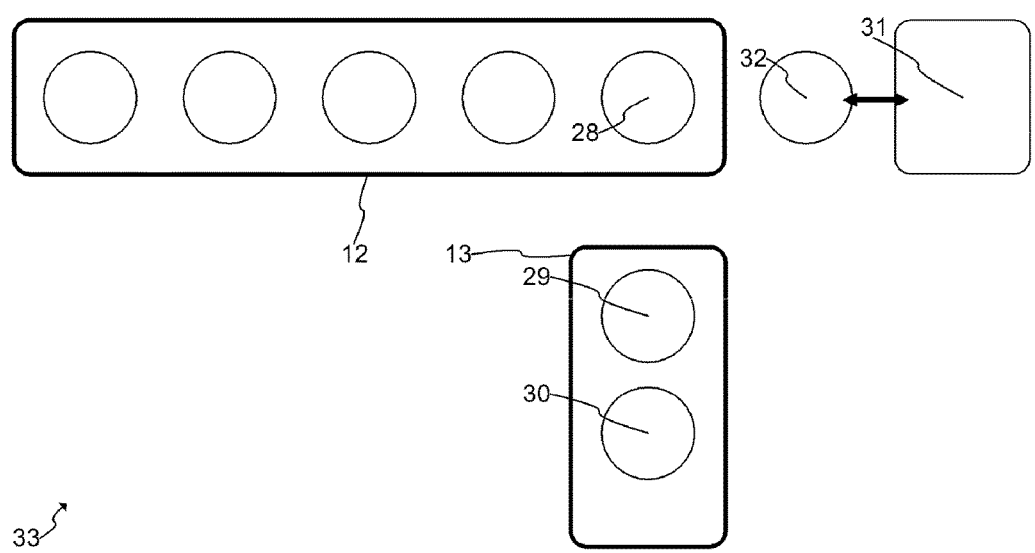
FIG. 3 explains a method of operating the virtual queuing system.

FIG. 3 shows virtual queues (12, 13) which include a main queue (12) comprising a plurality of subordinate positions (28) and a side queue (13) comprising prioritized parking positions (29, 30). Each of the prioritized parking positions (29, 30) are assigned a predetermined expiration period. To be ultimately served by an agent (31) of the call center (11), the user advances from the main queue (12) via the side queue (13) to an active position (32). Upon entering the side queue (13), the user is assigned a next-in-line position (29) among the parking positions (29, 30) and is prompted, through the user's respective user interface (14, 15, 16, 17, 18, 35), for example, via a short message service (SMS), Web notification, or push notification, to call the call center (11) using an individual telephone number in order to advance to the active position (32). If the user fails to call, the user is temporarily assigned a standby position (30) among the parking positions (29, 30) before, upon an optional repeat reminder, eventually being purged from the side queue (13).

Figure 4:
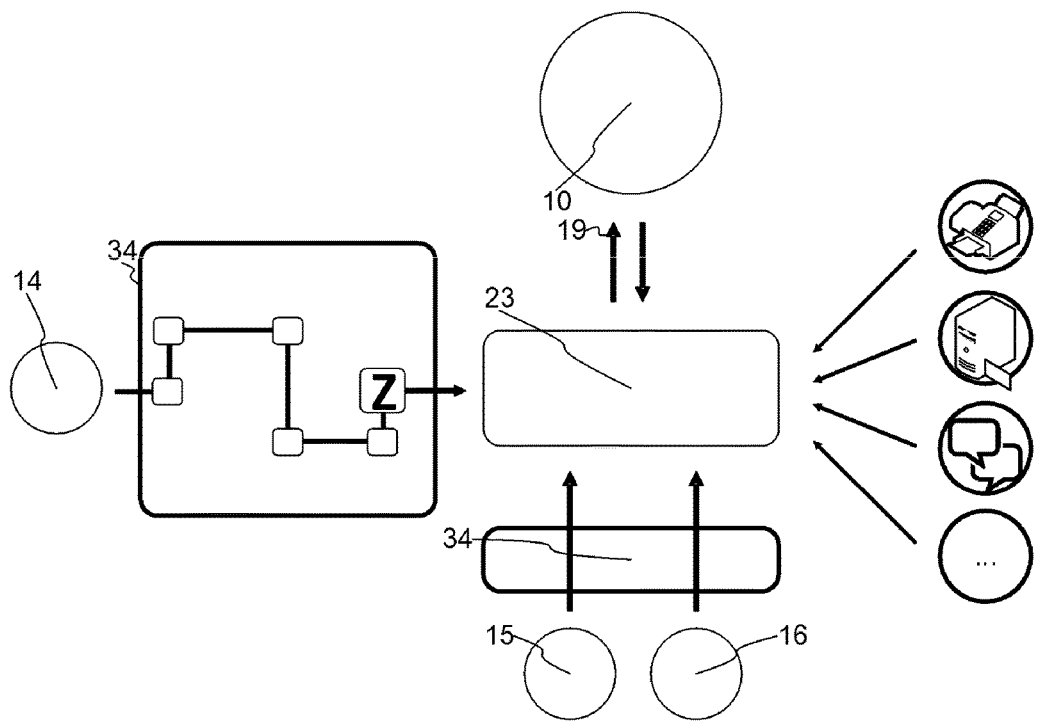
FIG. 4 schematically shows the connectivity of the virtual queuing system.

FIG. 4 shows that the aforementioned waiting call (14) is answered by an interactive voice response (34) comprising a call flow leading to a waiting loop before eventually being distributed by the automatic call distributor (23). In contrast, the remaining user interfaces (15, 16, 17, 18, 35), devoid of the need for verbal feedback by the user, pass over the interactive voice response (34), connecting to the virtual queuing system (10) directly via the automatic call distributor (23). With these graphical interfaces (15, 16, 17, 18, 35), the call may be followed by an immediate feedback survey or rating system for statistical evaluation through the dashboard (26) as well as live display to the agent (31) or team lead.

It is possible to collect agent specific or general data for statistical analysis and early detection of trends using the immediate feedback survey or rating system. For example, users may be prompted to award one to five stars to the service just rendered while their memory of the call center transaction is still fresh.

Figure 5:
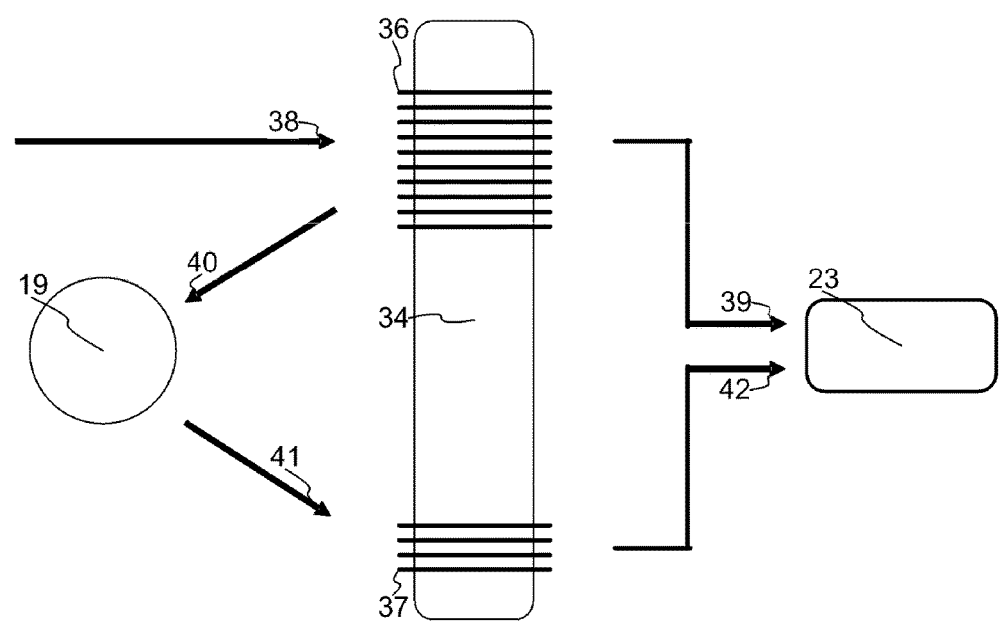
FIG. 5 shows an interactive voice response to a user of the queuing system.

FIG. 5 shows the interactive voice response (34) in additional detail. As depicted, a configurable subset (37) of IVR channels (36, 37) is reserved for the virtual queuing system (10). Whenever a caller calls a hotline (38) managed by the call center (11), the caller is assigned to a conventional IVR channel (36) and is connected (39) to the automatic call distributor (23) if no waiting is required. In case a longer queue (12) exists, however, the caller is prompted to wait (40) while virtual queuing (19) takes place. As soon as the individual waiting calls when up, his/her call is connected as a prioritized call (41), assigned to a reserved IVR channel (37), and put through first (42).

The present invention may be advantageously applied throughout the call center and customer service industry.

The present invention is not limited to embodiments described herein; reference should be had to the appended claims.

LIST OF REFERENCE NUMERALS

10 Virtual queuing system
11 Call center
12 Main queue
13 Side queue 14
15 Web widget 16
17 Native customer app
18 Generic app
19 Queuing
20 Virtual queuing server
21 Application programming interface
22 Virtual queuing connector module
23 Automatic call distributor
24 Firewall
25 Requests/pulls
26 Customer dashboard
27 Database
28 Subordinate positions
29 Next-in-line position
30 Standby position
31 Call center agent
32 Active position
33 Method of operating a virtual queuing system
34 Interactive voice response
35 Smartwatch
36 IVR channels
37 IVR channels reserved for virtual queuing
38 Caller calls hotline
39 No waiting required
40 Waiting with virtual queuing
41 Connected as prioritized call
42 Prioritized call is put through first

What is claimed is:
1. A virtual queuing system comprising:
a virtual queuing server connected to a call center which comprises an automatic call distributor and a firewall, the virtual queuing server being configured to maintain virtual queues;
a plurality of user interfaces configured to enqueu a call by a user of the call center to the virtual queues via the virtual queuing server;
a RESTful application programming interface configured to interface the plurality of user interfaces to the virtual queuing server; and a virtual queuing connector module configured to connect the automatic call distributor of the call center to the RESTful application programming interface across the firewall of the call center via requests or pulls initiated by the virtual queuing connector module, wherein, the virtual queuing connector module and the automatic call distributor are operated inside the firewall, the virtual queuing server, the RESTful application programming interface, and the plurality of user interfaces are operated outside the firewall and, when a call is up, the call is connected as a prioritized call, assigned to a reserved IVR channel, and put through first.

2. The virtual queuing system as recited in claim 1, wherein the plurality of user interfaces comprise a conventional waiting call based on at least one of a voice announcement and a text message, a web widget, a native app, and a smartwatch.

3. The virtual queuing system as recited in claim 2, wherein the plurality of user interfaces further comprise a web interface and an app.

4. The virtual queuing system as recited in claim 1, wherein the virtual queuing connector module is further configured to monitor a waiting call via the automatic call distributor.

5. The virtual queuing system as recited in claim 1, further comprising:

a customer dashboard configured to self-service the virtual queuing server, wherein, the RESTful application programming interface is further configured to interface the customer dashboard.

6. The virtual queuing system as recited in claim 5, wherein the customer dashboard is operated outside the firewall.

7. The virtual queuing system as recited in claim 1, further comprising:

a database attached to the virtual queuing server, the database being configured to manage the virtual queues.

8. The virtual queuing system as recited in claim 1, wherein, the virtual queues comprise, a main queue which comprises a plurality of subordinate positions, and a side queue which comprises prioritized parking positions, and the virtual queuing system is configured so that a user of the plurality of user interfaces, to be served by an agent of the call center, advances from the main queue via the side queue to an active position.

9. A method of operating the virtual queuing system as recited in claim 8, the method comprising:

assigning the user, upon the user entering the side queue, a next-in-line position among the prioritized parking positions; and prompting, via the plurality of user interfaces, the user to call the call center to advance to the active position.

10. The method as recited in claim 9, wherein, if the user fails to call the call center, the method further comprises:

assigning the user a standby position among the prioritized parking positions; and then purging the user from the side queue.

11. The method as recited in claim 9, further comprising:

connecting the plurality of user interfaces to the virtual queuing system via the automatic call distributor.

12. The method as recited in claim 11, further comprising:

answering a waiting call via an interactive voice response which comprises a call flow leading to a waiting loop and then distributed by the automatic call distributor, wherein, the plurality of user interfaces remaining pass over the interactive voice response.

13. A computer program configured to perform the method as recited in claim 9.

14. A computer-readable storage medium comprising the computer program as recited in claim 13.

* * * * *